March 24, 1959 — H. STERN — 2,879,467
VIBRATORY CONTROL APPARATUS
Filed Dec. 30, 1954 — 3 Sheets-Sheet 1

Inventor:
Hansjoerg Stern,
by Claude N. Mott
His Attorney.

March 24, 1959

H. STERN 2,879,467

VIBRATORY CONTROL APPARATUS

Filed Dec. 30, 1954

Inventor:
Hansjoerg Stern,
by
His Attorney.

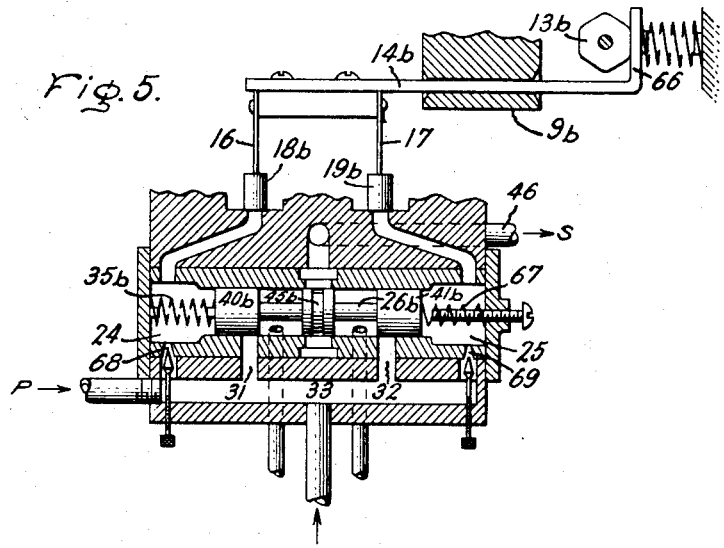
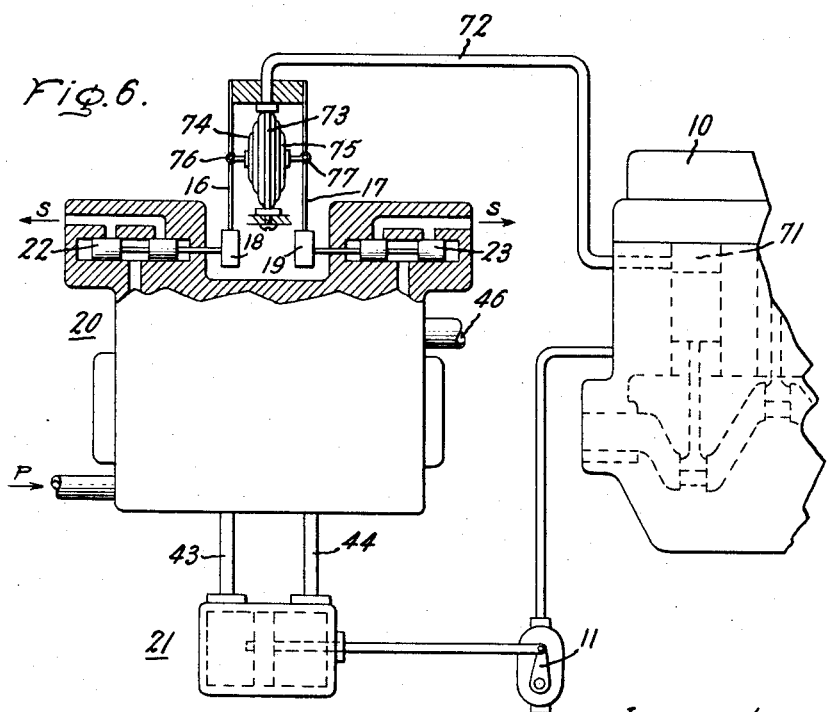

United States Patent Office 2,879,467
Patented Mar. 24, 1959

2,879,467

VIBRATORY CONTROL APPARATUS

Hansjoerg Stern, Schenectady, N.Y., assignor to General Electric Company, a corporation of New York Application December 30, 1954, Serial No. 478,665

19 Claims. (Cl. 322—32)

This invention relates to mechanical vibration frequency measurement and control apparatus, and more particularly to such apparatus which is especially adapted for measuring and controlling or maintaining a particular frequency or range of frequencies in the operation of the device from which the vibrations are being measured.

One of the most common control problems which is encountered is in the measurement and the control or maintenance of a predetermined desired speed of a power plant, an electric generator, or other apparatus. One of the major problems with prior vibration and speed measurement and control apparatus has been that where simplicity and lack of expense have been of prime importance, accuracy has been very limited.

Therefore, it is one important object of this invention to provide an extremely accurate yet simple and inexpensive measurement and control system which may be employed to measure and control the operating speeds of rotating or vibratory apparatus.

In prior vibration and speed measurement and control systems where a high accuracy has been required, it has been customary to employ an electrical control system. Such electrical systems are often expensive and complicated and not favored because of factors such as the conditions under which the apparatus must be operated.

Accordingly, it is another object of this invention to provide an extremely accurate vibration and speed measurement and control system which is not basically electrical in nature.

Further objects of this invention will be apparent from the following description and the accompanying drawings.

In carrying out the above objects of this invention in one preferred form thereof, two spring-mass systems are employed having natural (or resonant) frequencies of vibration respectively above and below the range of frequencies to be measured, or the frequency to be controlled. Connections are provided for mechanically vibrating the two spring-mass systems at a frequency which is proportional to the speed of operation of the apparatus which is to be measured or controlled. Each of the spring-mass devices is provided with a separate hydraulic valve device, and these hydraulic valve devices are connected to control the flow of hydraulic fluid through two respectively associated hydraulic control pressure chambers in accordance with the respective amplitudes of vibration of the spring-mass systems. An apparatus is provided, such as a hydraulic piston biased in opposite directions by the pressures within the hydraulic chambers for measuring the difference in the hydraulic liquid flows in terms of the position thereof to provide a measurement indication or a control operation such as by the control of a hydraulic servo system.

For a better and more complete understanding of the invention, reference should be made to the following specification and the accompanying drawings, in which the respective figures are as follows:

Figure 5 is a partial schematic view of a modified form of the invention as shown in Figure 1; and Figure 6 is a schematic view of a modified form of the invention as shown in Figure 1 in which the mechanical vibrations are derived from pressure measurements within the engine being controlled.

Figure 1:
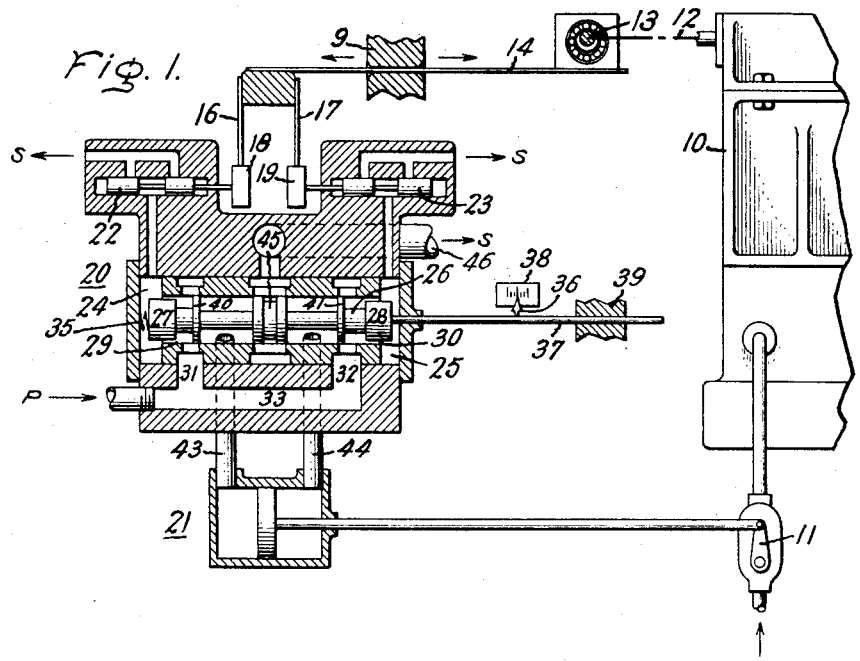
Figure 1 is a schematic diagram of one preferred embodiment of the apparatus of this invention as applied to the measurement of the speed of rotation of an engine and for the control of fuel to the engine for control of the speed thereof.

Referring more particularly to Figure 1, there is shown an engine 10, the speed of which is controlled by the adjustment of a throttle 11. An output shaft 12 of the engine 10 is connected through an eccentric 13 to impart a vibratory movement in an axial direction along a connecting rod member 14. The member 14 transmits the vibratory movements from the eccentric 13 to leaf spring members 16 and 17 to which weights or masses 18 and 10 are respectively attached. Each of the springs 16 and 17, with the associated masses 18 and 19, provides vibratory spring-mass systems having natural or resonant frequencies of vibration which are respectively chosen above and below the vibration frequency corresponding to the engine speed which is to be maintained by the system. The two spring-mass systems are connected to control the operation of a hydraulic control valve apparatus generally indicated at 20 to control the operation of a hydraulic positioning motor generally indicated at 21 to thus position the throttle 11.

The member 14 is provided with a fixed bearing support indicated at 9. The hydraulic control apparatus 20 preferably includes pilot valves 22 and 23 which are respectively connected to the masses 18 and 19 of the spring-mass systems. These pilot valves are arranged with suitable ports and hydraulic liquid conduits to control the flow of hydraulic liquid respectively through two control pressure chambers 24 and 25. More specifically, the pilot valves 22 and 23 are each arranged to open a discharge port leading to a low pressure sump or reservoir indicated in the diagram by an outgoing arrow and the letter symbol S whenever the associated spring-mass system exceeds a given amplitude of vibration. The amplitude of vibration at which this discharge operation becomes effective is in excess of the vibration excitation amplitude supplied from the eccentric 13 through the connecting rod 14 and therefore it will not be achieved except as the vibration frequency approaches the natural frequency of the connected spring-mass system.

A hydraulic control valve piston 26 is supported in a suitable cylinder bore between the control pressure chambers 24 and 25 and arranged for axial positioning therein in response to differences in the pressures within the control pressure chambers 24 and 25. The control piston 26 is provided with undersized end lands 27 and 28 which provide peripheral clearance spaces or capillary passages indicated at 29 and 30. These passages 29 and 30 provide a limited entry through ports 31 and 32 for hydraulic liquid under pressure from a pressure manifold 33 which is connected as indicated by an incoming arrow and the letter symbol P to a source of hydraulic liquid pressure (not shown). It will be understood, of course, that the source of hydraulic liquid under pressure may be of any suitable conventional construction.

As the axial position of control valve piston 26 shifts in response to differences in the pressures within the control pressure chambers 24 and 25, there will be an increase in the length of one of the capillary passages 29 or 30 and a corresponding decrease in the length of the other. For instance, if the pressure in chamber 24 is greater than the pressure in chamber 25, the control piston 26 will shift to the right, increasing the length of capillary passage 29 and decreasing the length of capillary passage 30. It is apparent, therefore, that the capillary passage 29 will present a greater restriction to the flow of incoming hydraulic pressure liquid to the higher pressure control chamber 24, and the passage 30 will present a lesser restriction to the incoming flow to chamber 25. This control operation by the capillary passage arrangements will cause a decrease in the pressure in chamber 24 and an increase in the pressure in chamber 25 until these pressures are equalized and the control valve piston 26 comes to rest in a displaced position. The structure described in this and the preceding paragraph, including the control valve 26 defining the capillary passages 29 and 30 and the control pressure chambers 24 and 25 having their pressures respectively controlled by individually operable pilot valves 22 and 23, forms a portion of the subject matter which is described and claimed in my copending patent application Serial Number 478,664, filed December 30, 1954.

In the above description, the masses 18 and 19 have been described as separate from the pilot valve pistons 22 and 23. However, the masses of the pilot valve pistons 22 and 23 must be considered as portions of the respective masses 18 and 19 in determining the natural or resonant frequencies of the spring-mass systems including the springs 16 and 17.

When the engine 10 is operating at the desired speed, the vibration frequency derived by the cam 13 from the engine shaft 12 is between the natural vibration frequencies of the spring-mass systems, including the springs 16 and 17 and the amplitudes of vibration of the springs 16 and 17, and the pilot valves 22 and 23 will be such that the amount of liquid discharged from the respective control pressure chambers 24 and 25 by the operation of the pilot valves 22 and 23 will be equal. Consequently, the control valve 26 will be held in the centered position shown, in which the capillary passages at 29 and 30 will be equal in length. In this portion of the description, the off-center biasing effect of a weak spring 35, hereinafter described as a starting spring, will be neglected. The position of the control valve piston 26 may be visually indicated such as by a suitable pointer 36 attached to a connecting rod 37 extending from the end of the piston 26. The pointer 36 is provided with a suitable indicating scale 38 and the connecting rod 37 may be provided with a suitable bearing 39. If the speed of the engine 10 changes slightly, the natural vibration frequency of one of the spring-mass systems will be approached more closely and the amplitude of that system will increase, while the natural frequency of the other spring-mass system will be departed from and the amplitude of that system will decrease. Thus, the discharging operation of one of the pilot valves 22 or 23 will be increased while the corresponding operation of the other will be decreased. This shift in pilot valve operation will cause a difference in the pressures within the control pressure chambers 24 and 25 and a consequent displacement of the control valve 26 which will be visually observable at the indicator 36.

The central portion of the control valve 26 between end lands 27 and 28 is in the form of a three land hydraulic control valve having outer lands 40 and 41 to control the connection of the high pressure inlet ports 31 and 32 respectively to power motor control conduits 43 and 44, and a four-way center land 45, herein referred to as a servovalve, for the alternate connection of the conduits 43 and 44 to a low pressure discharge connection provided by conduit passage 46. A shift in the axial position of the control valve 26 away from the centered position therefore causes a controlled operation of the power piston or power motor 21 to change the setting of the engine throttle 11 to thereby correct the speed of the engine 10. As the speed of the engine 10 shifts in the desired direction, such as corrective speed shift is measured by the spring-mass systems associated with springs 16 and 17 to shift the control valve 26 back to the centered position to thus discontinue the corrective operation of the power motor 21.

The starting spring 35, which may be designed to provide a relatively small force, is provided for the purpose of biasing the control valve 26 to the right in the diagram to provide an indication of a speed below the speed desired during the period when the engine 10 is being started and brought up to the range of speeds within which the control system is intended to operate with accuracy. This system may be made to operate with extreme accuracy of control by designing the spring-mass systems with natural frequencies of vibration which are within approximately 10% of the vibration frequency corresponding to the speed which is to be controlled. However, until the speed approaches that which corresponds to the natural vibration frequency of the low speed spring-mass system, which may be represented for instance in Figure 1 by the spring 17 and the mass 19, the pilot valves 22 and 23 may be designed to provide a negligible liquid discharge and the control piston 26 may thus be positioned primarily by the biasing spring 35.

The design of this control system is most easily accomplished with a generally symmetrical configuration in which the pilot valves 22 and 23 and the associated portions of the surrounding housing are of similar proportions and the spring-mass devices are designed with natural frequencies chosen approximately equally above and below the frequency corresponding to the speed to be controlled. However, it may sometimes be desirable to design the system unsymmetrically to provide a stronger control operation by the high speed indicating spring-mass device such as might be associated with spring 16. This can be accomplished by arranging the valve lands and ports of the pilot valve 22 for greater liquid flows for the discharge of hydraulic liquid from control pressure chamber 24 for a given amplitude of vibration. At the same time, the ports for chamber 25 may remain unchanged or may be reduced. In such an arrangement, the natural frequency of the high speed spring-mass device would exceed the control frequency by an amount generally greater than the amount by which the control frequency exceeds the natural frequency of the low-speed spring-mass device. The advantage of this unsymmetrical arrangement is that a more powerful overspeed control operation is provided. It might be theoretically possible, in a controlled machine which is capable of extremely rapid acceleration, for an overspeed condition to occur in which the speed achieved is beyond the range of the control operation of the system. However, this contingency can be averted by the unsymmetrical arrangement.

Figure 2:
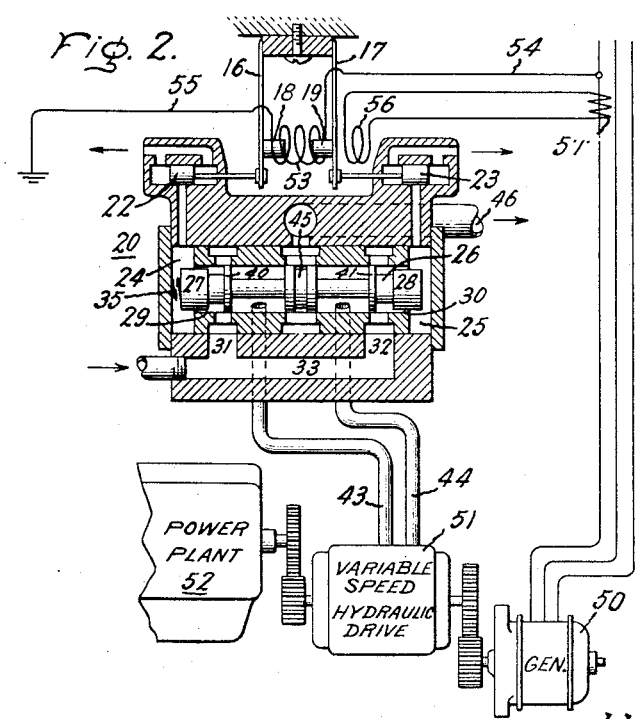
Figure 2 is a similar schematic diagram of a modification of the apparatus of Figure 1 in which the mechanical vibrations used for vibration frequency measurements are obtained electrically to control the speed of a generator by control of a variable speed hydraulic drive apparatus.

In Figure 2, a modified form of the control system of Figure 1 is shown as applied to the control of the speed and frequency of a generator 50. This is accomplished by the control of the ratio of the input to output speed of a variable speed hydraulic drive 51 which may be driven by a power plant 52 in which the speed may vary independently of the needs and requirements of the generator 50. The variable speed hydraulic drive 51 may preferably be constructed as shown in a copending patent application Serial No. 388,354, filed by Ernest E. Lewis on October 26, 1953, for a Hydraulic Drive System, and assigned to the same assignee as the present patent application.

In this modification, instead of employing a cam for the purpose of deriving a mechanical vibration proportional to mechanical speed, an electromagnetic winding 53 is provided which is connected between one of the electrical output conductors of the generator and ground by the connections indicated respectively at 54 and 55. The masses 18 and 19 are composed of magnetic material forming magnetic armature members within the electromagnetic winding 53. The mechanical vibrations which are thus imparted to the spring-mass systems are derived from pulses of magnetic attraction from electromagnetic winding 53. To produce these pulses, the output of generator 50 must be alternating current, or direct current with a pronounced alternating component or "ripple." The vibration excitation frequency is therefore proportional to the electrical output frequency of the generator 50. The remainder of the control system may be substantially identical to that shown in Figure 1 except that the hydraulic motor conduits 43 and 44 are connected to a positioning motor (not shown in detail) within the variable speed hydraulic drive 51 for the purpose of varying the speed ratio thereof.

For purposes of illustrating another design modification, the pilot valves 22 and 23 in Figure 2 are shown as including only a single valve land. It will again be understood, of course, that the masses of the pilot valves 22 and 23 must be considered as comprising portions of the masses 18 and 19 to form the respective associated spring-mass devices.

It is frequently desirable to operate several generators, such as generator 50 in Figure 2, electrically connected in parallel to a common load distribution system, with individual control systems such as shown in Figure 2 for each generator. In the operation of such parallel systems, it is necessary to make definite provisions for a proper distribution of the electrical load between individual generators, for otherwise a single generator may be overloaded while other generators of the system are lightly loaded. In order to accomplish such a load distribution, an additional electromagnetic winding 56 may be provided which is placed in proximity to the magnetic mass 19 but at a position which is separated from the other magnetic mass 18 to impose a load biasing electrical signal on the control system by aiding or opposing the magnetic effect of the electromagnetic winding 53 on the magnetic mass 19. The load signal for winding 56 is obtained from a current transformer 57 which measures the electrical current, and thus the load supplied from the generator 50.

Figure 3:
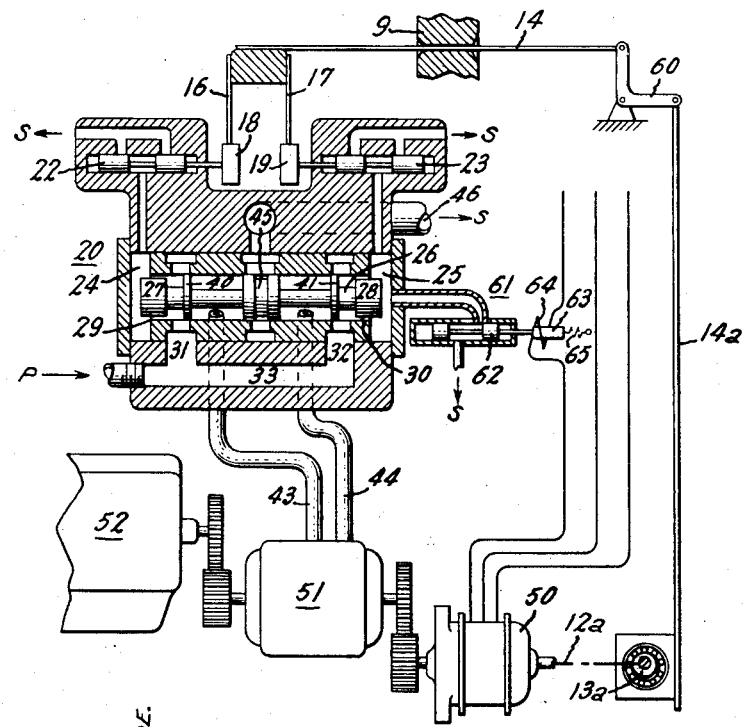
Figure 3 is a schematic view of a modified form of the invention as shown in Figure 1 as applied to the control of the speed of a generator as shown in the system of Figure 2.

Figure 3 is a schematic diagram which shows a further modification of the system of Figure 1 as applied to the control of the speed of a generator through a variable speed hydraulic drive system as shown in Figure 2. In this system, the vibration signal proportional to speed is again supplied mechanically from the shaft of the machine which is controlled. Thus the shaft 12a of the generator 50 is extended and supplied with an eccentric cam 13a similar to the cam 13 of Figure 1. The mechanical vibratory motion is transmitted from the cam 13a through a connecting rod 14a and a bell crank 60 to the connecting rod 14 and thus to the spring members 16 and 17. The remainder of the system of Figure 3 is substantially as shown in Figure 2.

However, for the purpose of providing a load division signal between the generator 50 and other generators which may be connected in parallel to the same load distribution system, the modification of Figure 3 includes a spring-biased, electromagnetically controlled, hydraulic bleed valve indicated generally at 61. This valve is arranged to bias the control system in order to obtain a load balance on the generator 50 by bleeding hydraulic liquid from the control pressure chamber 25. Valve 61 includes a valve piston 62 which is connected for actuation by an electromagnetic solenoid armature 63 in response to load currents within a load measurement electromagnetic winding 64 which is electrically connected in series with one of the output conductors of the generator 50. The valve 62 is biased to the open position such as by a spring 65. Normal load currents in winding 64 are sufficient to close the valve 61. If the load current becomes too low, indicating that a greater share of the load should be assumed by the generator 50, the force of the spring 65 will be sufficient to pull the armature 63 to the right against the electromagnetic force of winding 64. At least a partial opening of the valve 62 and a reduction of the pressure within the control pressure chamber 25 is thus provided to unbalance the control system in the direction which indicates a low speed condition. The control then speeds up the generator 50 slightly in order to provide for an assumption of a greater portion of the load. When the generator 50 has assumed a normal proportion of the total load, the current in the current measuring winding 64 is sufficient to close the valve 61 so that there is no further load adjustment operation.

When the system of Figure 3 is started, there is insufficient current for winding 64 to close the valve 61, and the control pressure chamber 25 will therefore be continuously biased in the low speed direction due to the discharge opening provided by the bleed valve 61. Under this circumstance, it is obviously unnecessary to provide for the starting spring 35 which was required in the modifications of Figures 1 and 2.

Other valve arrangements may be employed for valve 61 to modify the control pressures within the chambers 24 and 25 in order to control the load balance of the system. For instance, a double action valve can be employed which bleeds liquid from one chamber while admitting a small amount of liquid under pressure to the other chamber. Also, alternatively, a single electromagnetic valve can be employed to admit additional hydraulic liquid under pressure to the chamber 24 rather than bleeding liquid from the chamber 25.

The discharge or bleed port which is provided within the bleed valve 61 is preferably quite small in crosssectional area, even when fully open as shown in the diagram. Thus, even if the main load circuit for the generator 50 is opened, or for some other reason little or no current is supplied by the generator 50, and no excitation given to the current measurement winding 64, the speed of the system merely increases slightly. The system is so designed that the discharge operation of the pilot valve 22 will be sufficient upon a relatively slight increase in the speed above the control speed, to offset the full opening of the bleed valve 61 so that the control system continues to function.

Figure 4:
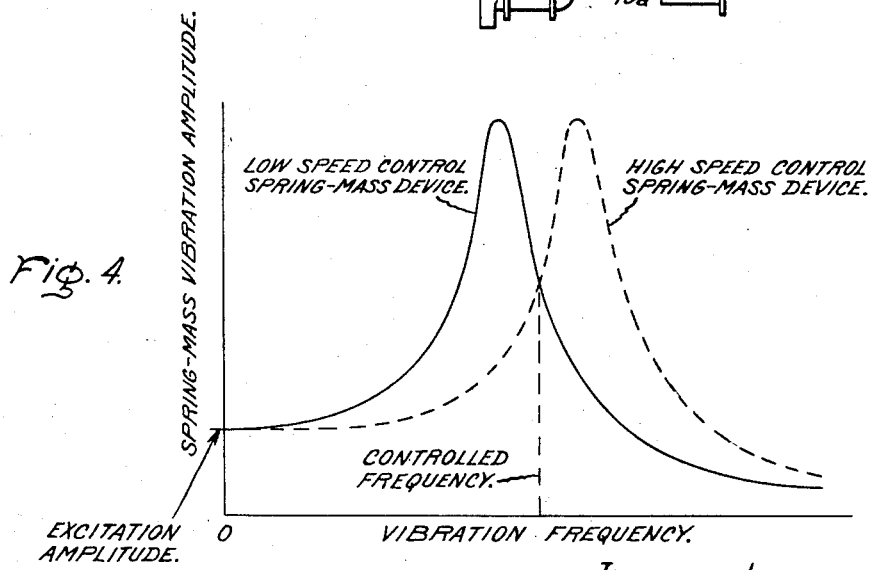
Figure 4 is a diagram illustrating the frequency and vibration amplitude relationships in the operation of the invention.

Figure 4 is a diagram illustrating the operation of the control system of this invention. This diagram is applicable to each of the modifications shown, neglecting the various biasing effects for starting and load balancing.

Figure 5 is a further modification of a portion of the system of Figure 1 in which a number of features are shown which may be separately incorporated in the previous modifications. Where extreme accuracy of control is desired, it is desirable to construct the vibratory frequency and speed control system of this invention for response to a vibration frequency which is a multiple of the rotational speed of the engine or apparatus which is to be controlled. Accordingly, a multiple frequency cam such as the cam 13b may be employed in which, for instance, six vibration impulses are provided by a hexagonal shape, and the system is designed for response to a vibration frequency which is six times the rotational speed of the apparatus to be controlled. A suitable spring-biased cam follower 66 may be provided which transmits the mechanical vibrations through a connecting rod 14b to the spring members 16 and 17.

Another modified feature which is illustrated in Figure 5 is the combination of the masses 18b and 19b of the spring-mass systems with the pilot valve structure. Thus, the masses 18b and 19b of Figure 5 are provided with lower surfaces which are positioned to cover associated hydraulic liquid discharge ports connected to the control pressure chambers 24 and 25. When the amplitude of vibration of the spring-mass systems increases in the measurement and control range, the masses 18b and 19b at least partially uncover the associated hydraulic liquid ports at each extreme limit in the vibratory movement so as to permit a discharge of liquid from the control pressure chambers, just as with the pilot valve structures 22 and 23 in the previous modifications of the invention. It is obvious that surfaces other than the lower end surfaces of the masses 18b and 19b could be used for the valving operation. For instance, the side surfaces which are viewed in Figure 5 might be used for this purpose in conjunction with ports terminating liquid conduits approaching the masses in a direction perpendicular to the plane of the diagram. With such a modification, two ports are preferably employed with each mass, one port being in front of the mass and the other behind the mass, in order to equalize side thrusts.

Another modified feature illustrated in the embodiment of Figure 5 is the employment of a spring-centered control valve 26b which does not employ capillary passages 29 and 30 to restrict the admission of hydraulic liquid into the control pressure chambers 24 and 25. The control valve 26b is essentially centered between two opposed compression springs 35b and 67, and the restricted entry of hydraulic liquid to the control pressure chambers 24 and 25 is accomplished by means of adjustable orifices 68 and 69. The spring 35b is slightly stronger than the spring 67 in order to provide for starting the apparatus as described in connection with the starting spring 35 in the previously described modifications. This requires that a slightly higher pressure must be maintained in the control pressure chamber 25 in order to center the control valve 26b as shown in the diagram. It will be understood, however, that the major centering forces are provided by the opposition of forces between the two springs 35b and 67.

In Figure 6 there is shown a further modification of the control system of Figure 1 in which the vibration signal is derived through the detection of pressure pulses rather than through a cam which is attached to an output shaft of the apparatus which is to be controlled. Thus, a pressure transmission conduit 72 is connected from a piston cylinder enclosure 71 to a flexible pressure responsive enclosure 73. The enclosure 73 may include two flexible metallic diaphragms 74 and 75 which are sealed together at their peripheral edges and have their center portions independently pivotally connected as indicated at 76 and 77, to the spring members 16 and 17. The intermittent pulses of pressure accompanying the power strokes of the piston within the cylinder 71 will be transmitted through the conduit 72 to the diaphragms 74 and 75. Through the pivotal connections 76 and 77, these pulses will provide a corresponding movement of the spring members 16 and 17. When the pulses occur at a frequency within the control range of the apparatus, the operation of the control system will be analogous to the operation described above in connection with the other modifications. It is apparent that the spring strengths of the metallic diaphragms 74 and 75 must be considered respectively as portions of the spring strengths of the spring members 16 and 17. It may be that the spring gradients provided by the diaphragms 74 and 75 will be more than sufficient for this purpose, and the members 16 and 17 may be rigid and pivotally mounted at their upper ends.

It is obvious that other physical arrangements employing diaphragms or bellows may be employed to transform the pressure pulses from the chamber 71 into vibratory movements at the spring members 16 and 17. For instance, it might be feasible to provide a single bellows which would vibrate the upper support of the spring members 16 and 17 just as the cam member 13 in Figure 1 transmits such vibration through the connecting rod 14 in Figure 1.

The following claims are intended to define the valid scope of this invention over the prior art and to cover all changes and modifications falling within the true spirit and valid scope of the invention.

What I claim as new and desire to secure by Letters Patent of the United States is:

1. A control apparatus comprising two mechanical-vibratory devices having natural vibration frequencies respectively above and below a desired value of a frequency to be controlled, means for mechanically exciting said devices at said controlled frequency, and means responsive to differences in the respective amplitudes of vibration of said devices upon deviation of said controlled frequency from said desired value for returning said controlled frequency to said desired value.

2. A frequency measuring apparatus comprising two spring-mass devices having natural vibration frequencies respectively above and below the range of frequencies to be measured, means for mechanically exciting said devices at the frequency to be measured, and mechanical means responsive at frequencies within said range to differences in the respective amplitudes of vibration of said devices for indicating said frequency to be measured.

3. A control system for maintaining a predetermined value of speed comprising means for deriving a mechanical vibration from the apparatus to be controlled, having a frequency proportional to the speed thereof, two spring-mass devices connected to said vibration means and having natural vibration frequencies respectively above and below the frequency of said vibration means corresponding to the desired speed, speed adjusting means for the apparatus to be controlled and a positioning servo means connected to position said speed adjusting means in response to differences in the amplitudes of vibration of said spring-mass devices.

4. In combination with apparatus characterized by continuously recurring mechanical disturbances of a frequency which is a measure of an operating condition thereof, a frequency responsive measurement system for measuring said operating condition comprising two spring-mass devices having natural vibration frequencies respectively above and below the range of frequencies to be measured, means connected to said devices for transmitting said disturbances thereto, valve means associated with each of said devices, and means responsive to differences in the vibration amplitudes of said respective valve means for indicating the measured value of said operating condition.

5. A vibration frequency measurement apparatus comprising two spring-mass devices having natural vibration frequencies respectively above and below a desired range of frequencies to be measured, means for vibrating said devices at the frequency to be measured, separate valve means connected to each of said devices and operable to intermittently open associated valve ports upon movement of said devices at amplitudes greater than the amplitude of said vibrating means, enclosures defining fluid pressure chambers respectively connected to said ports, separate means for admitting and discharging fluid under pressure at limited rates to each of said chambers, one of said means for each of said chambers being comprised of said associated valve means, and means responsive to relative differences between the pressures within said chambers derived from the control of fluid flow therethrough by said valve means for indicating the frequency to be measured.

6. A frequency control apparatus comprising two spring-mass devices having natural vibration frequencies respectively above and below a desired value of a frequency to be controlled, means for mechanically exciting said devices at said controlled frequency, and separate valve means connected to each of said devices and operable to intermittently open associated valve ports upon movement of said devices at amplitudes greater than the excitation amplitude, enclosures defining fluid pressure chambers respectively connected to said ports, separate means for admitting and discharging fluid under pressure in limited amounts to each of said chambers, one of said means for each of said chambers being comprised of said valve ports, and means responsive to relative differences between the pressures within said chambers due to differences in the fluid flows controlled by said respective valve means upon deviation of said controlled frequency from said desired value for returning said controlled frequency to said desired value.

7. A frequency control apparatus comprising two spring-mass devices having natural vibration frequencies respectively above and below a desired value of a frequency to be maintained, means for vibrating said devices at the frequency to be maintained, separate valve means associated with each of said devices and operable to intermittently open associated valve ports upon movement of said devices at amplitudes greater than the amplitude of said vibrating means, enclosures defining liquid pressure chambers respectively connected to said ports, separate means for admitting and discharging liquid under pressure at limited rates for each of said chambers, one of said means for each of said chambers being comprised of said associated valve means, and means responsive to relative differences between the pressures within said chambers derived from the control of fluid flow therethrough by said valve means for controlling the frequency to be maintained, said pressure difference responsive means comprising a hydraulic control valve, a hydraulic positioning motor connected for movement in response to said control valve, and frequency parameter control means connected for positioning by said motor.

8. A control system for maintaining a predetermined speed of apparatus to be controlled comprising means for deriving a mechanical vibration having a frequency proportional to the controlled speed, two spring-mass devices connected to said vibration means and having natural vibration frequencies respectively above and below the vibration frequency of said means at said predetermined speed, a hydraulic control valve, hydraulic servo means connected for positioning by said control valve, speed control means connected for positioning by said servo means for control of said speed, said control valve including associated control pressure chamber enclosures for bias thereof in opposite senses, means for admitting hydraulic pressure liquid to said chambers at limited flow rates, and pilot valve means associated with said spring-mass devices for controlling the discharge of hydraulic liquid from said respective control pressure chambers in accordance with differences in the amplitudes of vibration of said associated spring-mass devices.

9. A vibration frequency measurement apparatus comprising two spring-mass devices having natural vibration frequencies respectively above and below a desired range of frequencies to be measured, means for vibrating said devices at the frequency to be measured, separate valve means connected to each of said devices and operable to intermittently open associated valve ports upon movement of said devices at amplitudes greater than the amplitude of said vibrating means, enclosures defining fluid pressure chambers respectively connected to said ports, a piston positionable in response to relative differences between the pressures within said chambers for indicating the frequency to be measured, separate means for admitting and discharging fluid under pressure at limited rates to each of said chambers, one of said means for each of said chambers being comprised of said associated valve means, and the other of said means for each of said chambers being comprised of restricted passages associated with the ends of said piston, the passages at opposite ends of said piston being variable in length in opposite senses upon piston movement.

10. A speed control system for a power plant comprising a valve for controlling the flow of motive fluid thereto, a hydraulic positioning motor connected to position said valve, a hydraulic control valve connected to control the operation of said positioning motor, said control valve including opposed control pressure chamber enclosures for controlling the operation thereof, separate means for admitting and discharging hydraulic liquid under pressure at limited rates to each of said chambers, at least one of said separate means for each of said chambers comprising spring-mass controlled valve means, said spring-mass valve means having natural vibration frequencies for said separate chambers respectively above and below a frequency corresponding to the desired power plant speed and being operable to position said control valve in accordance with differences in the vibration amplitudes thereof, vibration excitation means connected to said spring-mass valve means, said vibration excitation means being arranged for mechanical connection to the power plant to be controlled for deriving a vibration frequency proportional to the power plant speed.

11. In combination with a power plant of the type having a combustion chamber in which pressure pulses occur with a frequency proportional to speed, a speed control system comprising a valve for controlling the flow of motive fluid to said power plant, a hydraulic positioning motor connected to position said valve, a hydraulic control valve connected to control the operation of said positioning motor, said control valve including opposed control pressure chamber enclosures for controlling the operation thereof, separate means for admitting and discharging hydraulic liquid under pressure at limited rates to each of said chambers, at least one of said separate means for each of said chambers comprising spring-mass controlled valve means, said spring-mass valve means having natural vibration frequencies for said separate chambers respectively above and below a frequency corresponding to the desired power plant speed and being operable to position said control valve in accordance with differences in the vibration amplitudes thereof, vibration excitation means comprising an expansible chamber enclosure connected to said spring-mass valve means for imparting movements thereto upon expansion thereof, said expansible chamber being connected to said combustion chamber for operation in response to the pressure pulses therein.

12. A drive system for receiving power at a variable speed and for delivering power at a constant speed by variation of the ratio of input to output speeds comprising a variable speed hydraulic drive, a hydraulic control valve connected to said drive for varying the ratio of the input and output speeds thereof, said control valve including two opposed control pressure chamber enclosures for controlling the operation of said valve, pilot valves connected to each of said chambers for controlling the respective pressures therein, vibratory spring-mass devices associated with each of said pilot valves for controlling an intermittent change in pilot valve connections to position said control valve in response to vibration amplitude differences between said spring-mass devices, said spring-mass devices having natural vibration frequencies respectively above and below a vibration frequency corresponding to the output speed to be maintained, and vibration excitation apparatus connected to impart vibration signals to said spring-mass devices corresponding to output speed.

13. A drive system for receiving power at a variable speed and for delivering power to drive a generator at a constant speed by variation of the ratio of input to output speeds comprising a variable speed hydraulic drive means, a hydraulic control valve connected to said variable speed drive means for varying the ratio of the input and output speeds thereof, said control valve including two opposed control pressure chamber enclosures for controlling the operation of said valve, two separate pilot valves connected to said respective chambers for controlling the respective pressures therein, separate spring-mass devices associated with each of said pilot valves for controlling an intermittent change in the pilot valve connections to control the position of said control valve in response to differences in the amplitudes of vibration of said respective spring-mass devices, said spring-mass devices having natural vibration frequencies respectively above and below a vibration frequency corresponding to the generator speed to be maintained, and vibration excitation means connected to said generator for imparting vibration signals to said spring-mass devices corresponding to generator speed and load signal generating means connected to measure the output of said generator and arranged to bias the operation of one of said spring-mass devices to shift the speed control adjustment of said system to regulate the electrical load assumed by said generator.

14. A drive system for receiving power at a variable speed and for delivering power to drive a generator at a constant speed by variation of the ratio of input to output speeds comprising a variable speed hydraulic drive means, a hydraulic control valve connected to said variable speed drive means for varying the ratio of the input and output speeds thereof, said control valve including two opposed control pressure chamber enclosures for controlling the operation of said valve, two separate pilot valves connected to said respective chambers for controlling the respective pressures therein, separate spring-mass devices associated with each of said pilot valves for controlling an intermittent change in the pilot valve connections to control the position of said control valve in response to differences in the amplitudes of vibration of said respective spring-mass devices, said spring-mass devices having natural vibration frequencies respectively above and below a vibration frequency corresponding to the generator speed to be maintained, and vibration excitation means connected to said generator for imparting vibration signals to said spring-mass devices corresponding to generator speed, said excitation means comprising an electromagnetic winding and said masses of said spring-mass devices comprising magnetic members arranged for attraction and repulsion by said winding, a load signal measurements winding connected to measure the output current of said generator and arranged in proximity to one of said magnetic members to bias the operation of the associated spring-mass device to shift the speed control adjustment of said system to regulate said output current.

15. A drive system for receiving power at a variable speed and for delivering power to drive a generator at a constant speed by variation of the ratio of input to output speeds comprising a variable speed hydraulic drive means, a hydraulic control valve connected to said variable speed drive means for varying the ratio of the input and output speeds thereof, said control valve including two opposed control pressure chamber enclosures for controlling the operation of said valve, two separate pilot valves connected to said respective chambers for controlling the respective pressures therein, separate spring-mass devices associated with each of said pilot valves for controlling an intermittent change in the pilot valve connections to control the position of said control valve in response to differences in the amplitudes of vibration of said respective spring-mass devices, said spring-mass devices having natural vibration frequencies respectively above and below a vibration frequency corresponding to the generator speed to be maintained, and vibration excitation means arranged for connection to the generator for imparting vibration signals to said spring-mass devices corresponding to generator speed, and a load signal responsive solenoid valve arranged for connection to the load circuit of the generator for actuation in response to load current, said solenoid valve including a hydraulic connection to at least one of said control pressure chambers to shift the speed control adjustment of said system to regulate the electrical load assumed by the generator being controlled.

16. A flow control apparatus for an operating unit comprising two mechanical-vibratory devices having natural vibration frequencies respectively above and below a desired value of a frequency to be controlled so as to indicate speed error of the unit, means for exciting said devices at said controlled frequency, and hydraulic means responsive to differences in the respective amplitudes of vibration of said devices upon deviation of said controlled frequency from said desired value, valve means cooperating with said hydraulic means in proportion to the speed error for returning said controlled frequency to said desired value so as to obtain an infinite steady-state gain in the unit.

17. A control apparatus adapted for measuring and controlling a range of frequencies in an operation of a device from which vibrations are measured comprising two spring-mass systems having natural frequencies of vibration respectively above and below the range of frequencies to be controlled, means for vibrating said systems at a frequency proportional to the speed of operation of the device, a hydraulic valve device operatively coupled to each of said systems, two hydraulic control pressure chambers, each one of said pressure chambers having one of said hydraulic valve devices connected thereto for controlling the flow of fluid therethrough in accordance with the respective amplitudes of vibration of said systems, a hydraulic piston biased in opposite directions by the pressures within said hydraulic chambers for transmitting the difference in fluid flow in terms of the position thereof, servovalve means associated with said hydraulic piston so as to be responsive to the difference in amplitude between said two spring-mass systems, a servomotor controlled by said servovalve and adapted to move at a speed proportional to the position of said servovalve so as to be, in turn, proportional to the speed error of the device as indicated by the difference in amplitude in said spring-mass systems.

18. A flow responsive appartus for continuous control of an operating unit comprising two mechanical-vibratory devices having natural frequencies respectively above and below a desired range of frequencies to be controlled, means for exciting said devices at a frequency proportional to the speed error of the unit from a predetermined speed, hydraulic means responsive to the difference in amplitude between said two mechanical-vibratory devices for varying the flow of fluid therethrough in proportion to the speed error of the unit, flow control means associated with said hydraulic means for continuously transmitting the difference in fluid flow therein in terms of displacement, and hydraulic servo means controlled by said flow control means so as to be actuated in proportion to the displacement of said flow control means for returning said controlled frequency to said desired range.

19. A vibratory control apparatus comprising two mechanical-vibratory devices having natural vibration frequencies respectively above and below a desired value of a frequency to be controlled comprising means for mechanically vibrating said devices at said controlled frequency, hydraulic valve means associated with each of said devices and adapted to control the flow of hydraulic fluid through associated control pressure chambers in accordance with the respective amplitudes of vibration of the vibratory devices, and means responsive to differences in the respective amplitudes of vibration of said devices, upon deviation of said controlled frequency from said desired value, for returning said controlled frequency to said desired value, said last-named means including both of said hydraulic valve means.

References Cited in the file of this patent

UNITED STATES PATENTS

| | | |
|---|---|---|
| 759,512 | Frahm | May 10, 1904 |
| 1,550,467 | Thoma | Aug. 18, 1925 |
| 1,624,093 | Davis | Apr. 12, 1927 |
| 1,818,826 | Tabb | Aug. 11, 1931 |
| 2,709,421 | Avery | May 31, 1955 |
| 2,729,751 | Westman | Jan. 3, 1956 |

FOREIGN PATENTS

| | | |
|---|---|---|
| 107,239 | Switzerland | Dec. 1, 1924 |
| 210,708 | Germany | June 8, 1909 |